(12) United States Patent
Kosugi et al.

(10) Patent No.: US 9,230,584 B1
(45) Date of Patent: Jan. 5, 2016

(54) POSITION DEMODULATION APPARATUS AND POSITION DEMODULATION METHOD

(71) Applicant: Kabushiki Kaisha Toshiba, Minato-Ku, Tokyo (JP)

(72) Inventors: Tatsuhiko Kosugi, Kanagawa (JP); Takuya Ogawa, Tokyo (JP); Daisuke Sudo, Kanagawa (JP); Hideki Hironaka, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 14/718,629

(22) Filed: May 21, 2015

Related U.S. Application Data

(60) Provisional application No. 62/127,138, filed on Mar. 2, 2015.

(51) Int. Cl.
 *G11B 5/596* (2006.01)
(52) U.S. Cl.
 CPC ...................................... *G11B 5/596* (2013.01)
(58) Field of Classification Search
 None
 See application file for complete search history.

(56) References Cited

U.S. PATENT DOCUMENTS

| | | | |
|---|---|---|---|
| 6,556,367 | B2 | 4/2003 | Takahashi |
| 7,616,399 | B1 * | 11/2009 | Chen ................... G11B 5/59627 360/77.08 |
| 8,553,345 | B2 | 10/2013 | Oyabu et al. |
| 8,625,230 | B2 | 1/2014 | Kosugi et al. |
| 8,848,303 | B1 | 9/2014 | Yamada |
| 9,019,652 | B1 | 4/2015 | Kosugi et al. |
| 2010/0302675 | A1 | 12/2010 | Kosugi et al. |
| 2011/0249354 | A1 | 10/2011 | Kosugi et al. |

FOREIGN PATENT DOCUMENTS

| | | | |
|---|---|---|---|
| JP | 2000-090610 A | 3/2000 | |
| JP | 2009-277315 A | 11/2009 | |

* cited by examiner

*Primary Examiner* — K. Wong
(74) *Attorney, Agent, or Firm* — White & Case LLP

(57) ABSTRACT

According to one embodiment, a position demodulation apparatus is provided which demodulates a first demodulated signal and a second demodulated signal, based on a servo-pattern read signal read out by a head from a medium, acquires a plurality of sets of a vector length and phase angle of vectors on a phase plane denoting the first and second demodulated signals, detects a phase angle for which the vector length is greatest based on the sets acquired, and executes rotational correction using the difference between the detected phase angle and a particular reference angle as a correction amount.

20 Claims, 8 Drawing Sheets

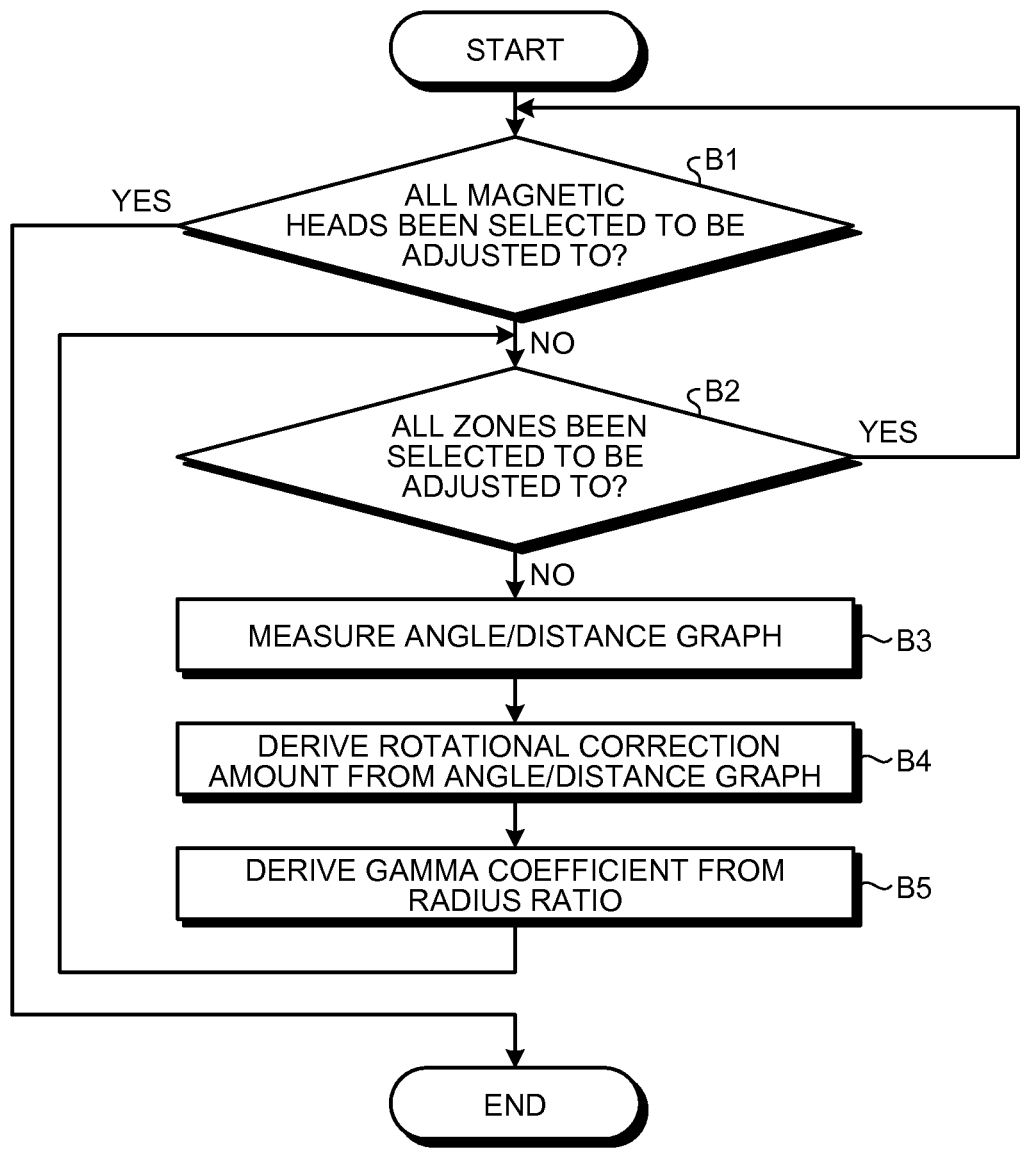

POSITION DEMODULATION APPARATUS AND POSITION DEMODULATION METHOD

CROSS-REFERENCE TO RELATED APPLICATIONS

This application is based upon and claims the benefit of priority from U.S. Provisional Application No. 62/127,138, filed on Mar. 2, 2015; the entire contents of which are incorporated herein by reference.

FIELD

Embodiments described herein relate generally to a position demodulation apparatus and position demodulation method.

BACKGROUND

In hard disk drives, a magnetic head mounted at tip portion of an actuator arm is moved using the actuator arm. The magnetic head is moved in radial directions of a magnetic disk that is a recording medium to record and read data onto and from the magnetic disk. The recording medium has data areas onto which to record user data and servo areas on which data used in head positioning control is recorded.

In the above hard disk drive, when the magnetic head passes across the servo area, position of the magnetic head is identified based on a signal read from the servo area. And in the hard disk drive, by adjusting the position of the magnetic head based on the identified position by the actuator arm, the magnetic head can be controlled to be in a desired position.

As to patterns recorded on the servo area, there are several types, for example, a NULL servo pattern, an area servo pattern, a phase servo pattern, and the like exist. For example, the NULL servo pattern comprises two blocks different in magnetization pattern. The position of the magnetic head can be identified by position signals read from the two blocks of the NULL servo pattern. It is understood that these position signals are represented as a Lissajous figure when they are plotted on a phase plane, and that as its shape becomes closer to a circle, the position can be identified more accurately.

However, various distortions occur in the actually obtained position signals. For example, the Lissajous figure may be not a circle but deformed in a rectangle shape or inclined. Thus, in the conventional art, improvement in accuracy in identifying the position of the magnetic head is attempted by correcting for the above deformation. However there is some room for improvement in the method of determining the amount of correction.

BRIEF DESCRIPTION OF THE DRAWINGS

FIG. 12 is a flow chart showing an example procedure of method of determining a correction value in the disk storage apparatus.

DETAILED DESCRIPTION

In general, according to one embodiment, a position demodulation apparatus includes a medium on which a servo pattern is recorded and a controller, and the controller comprises a demodulation unit, an acquiring unit, a detecting unit, and a rotational correction unit. The demodulation unit demodulates a first demodulated signal and a second demodulated signal having a phase difference of 90 degrees from the first demodulated signal, based on a read signal read out by a head from the servo pattern. The acquiring unit acquires a plurality of sets of a vector length and phase angle of vectors on a phase plane denoting the first and second demodulated signals sampled at particular timings respectively. The detecting unit detects a phase angle for which the vector length is greatest based on the plurality of sets acquired by the acquiring unit. The rotational correction unit calculates difference between the phase angle detected by the detecting unit and a particular reference angle as a correction amount and executes rotational correction on each of the vectors so as to incline their angles by the correction amount.

Exemplary embodiments of a position demodulation apparatus and a position demodulation method will be explained below in detail with reference to the accompanying drawings. The present invention is not limited to the following embodiments.

Figure 1:
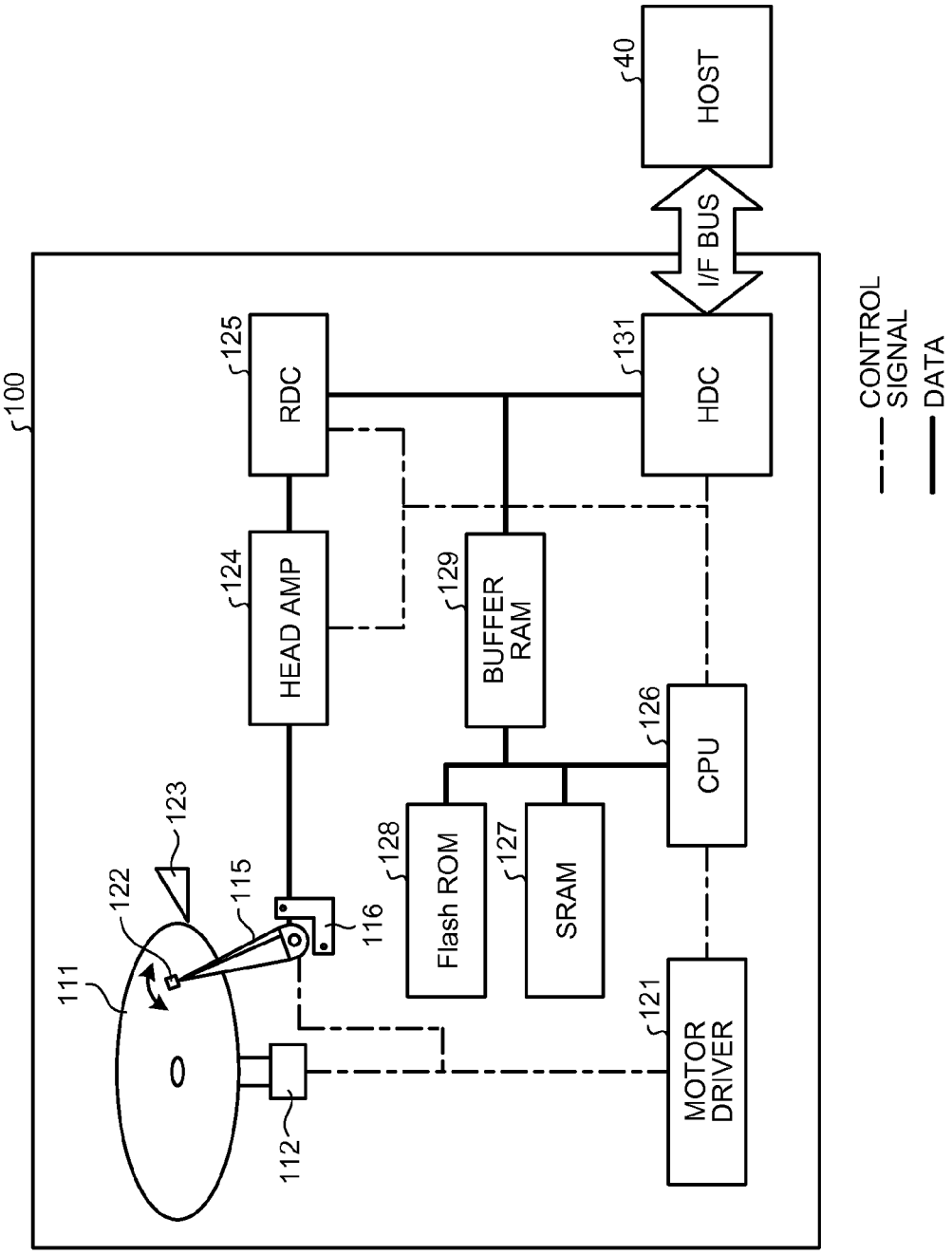
FIG. 1 is a block diagram showing an example of electrical hardware configuration of a disk storage apparatus according to an embodiment.

First, a disk storage apparatus 100 to which the position demodulation apparatus according to the present embodiment is applied will be described. FIG. 1 is a block diagram showing an example of electrical hardware configuration of the disk storage apparatus 100 according to the present embodiment.

In FIG. 1, a magnetic disk 111 is a disk-shaped recording medium and one or some magnetic disks is/are provided along an axial direction of rotation axis. The magnetic disk 111 is rotated by a spindle motor 112 with the rotation axis as the center at a predetermined rotational speed. Rotation of the spindle motor 112 is driven by a motor driver 121.

A corresponding number of magnetic heads 122 to the number of magnetic disks 111 are provided, and data is written onto and read from the magnetic disk 111 by a write head and a read head incorporated therein. The magnetic heads 122 is provided at the tip of an actuator arm 115 and moved by a voice coil motor (VCM) 116 driven by the motor driver 121 in radial directions of the magnetic disk 111. While the rotation of the magnetic disk 111 is stopped, the magnetic heads 122 is evacuated onto a ramp 123.

A head amplifier 124 amplifies the signal read by the magnetic head 122 from the magnetic disk 111 to output to a RDC (Read Write Channel) 125. Further, the head amplifier 124 amplifies a signal supplied from the RDC 125 to write data onto the magnetic disk 111 to supply to the magnetic head 122.

The RDC 125 code modulates data to be written onto the magnetic disk 111 supplied from an HDC 131 to supply to the head amplifier 124. Further, the RDC 125 code demodulates a signal supplied from the head amplifier 124 into digital data to output to the HDC 131.

An SRAM (Random Access Memory) 127 that is a for-operation memory, a flash ROM (Read Only Memory) 128 that is a nonvolatile memory, and a for-temporary-storage buffer RAM 129 are connected to a CPU 126. The CPU 126 controls the disk storage apparatus 100 comprehensively according to firmware stored beforehand in the flash ROM 128 and the magnetic disk 111.

The HDC (Hard Disk Controller) 131 performs control of transmission and reception of data to and from a host computer (host) 40 via an I/F bus, control of the buffer RAM 129, a data error correction process on record data, and so on. The buffer RAM 129 is used as a cache for data which is to be transmitted to or has been received from the host 40.

Next, the magnetic disk 111 will be described. The magnetic disk 111 comprises data areas onto which to record user data and servo areas on which servo information is stored. Servo patterns are recorded on the servo areas extending along radial directions (outward directions) from the rotation center in arc shapes. The servo patterns are data used to position the magnetic head 122 over the magnetic disk 111. Further, the recording surface of the magnetic disk 111 is divided into multiple zones at a predetermined pitch along a radial direction such as inner, center, and outer. There are no specific requirements on the pitch and the division number in dividing into zones, and they may be set at any values according to the implementation.

The magnetic disk 111 is a storage medium constituted by a magnetic film formed on a disk-shaped metal- or glass-made substrate. When recording data onto the magnetic disk 111, a magnetic field from the magnetic head 122 is applied to a recording region to record data onto so as to change the magnetization state of the magnetic material in the surface, thereby recording data. When reading data from the magnetic disk 111 to reproduce the data, the magnetic head 122 is moved to a recording region from which to reproduce data, and the magnetization state of the magnetic material of the magnetic disk 111 is read. The recording method for the magnetic disk 111 includes a perpendicular magnetic recording method and a longitudinal magnetic recording method.

In the present embodiment, the method of identifying the position of the magnetic head 122 over the magnetic disk 111 is to use NULL demodulation. The servo patterns in the servo areas are configured to have a preamble portion, an SM (servo mark) portion, a gray code portion, and a burst portion. The preamble portion is at the start of the servo pattern and, in the present embodiment, is a region having a period of 4T. The burst portion is a region for detecting the amount by which the magnetic head 122 is offset from the track center of a track. Where the NULL demodulation is used, the burst portion has two blocks (hereinafter called a NULL pattern). In the present embodiment, the burst portion is a region having a period of 8T. As such, where the period of the preamble portion is 4T with the period of the burst portion being 8T, the frequency doubles. Hence, where the NULL demodulation is used as does the disk storage apparatus 100 according to the present embodiment, correction based on the difference in the frequency between the initial phase of the preamble portion and the NULL pattern of the burst portion is needed.

Figure 2:
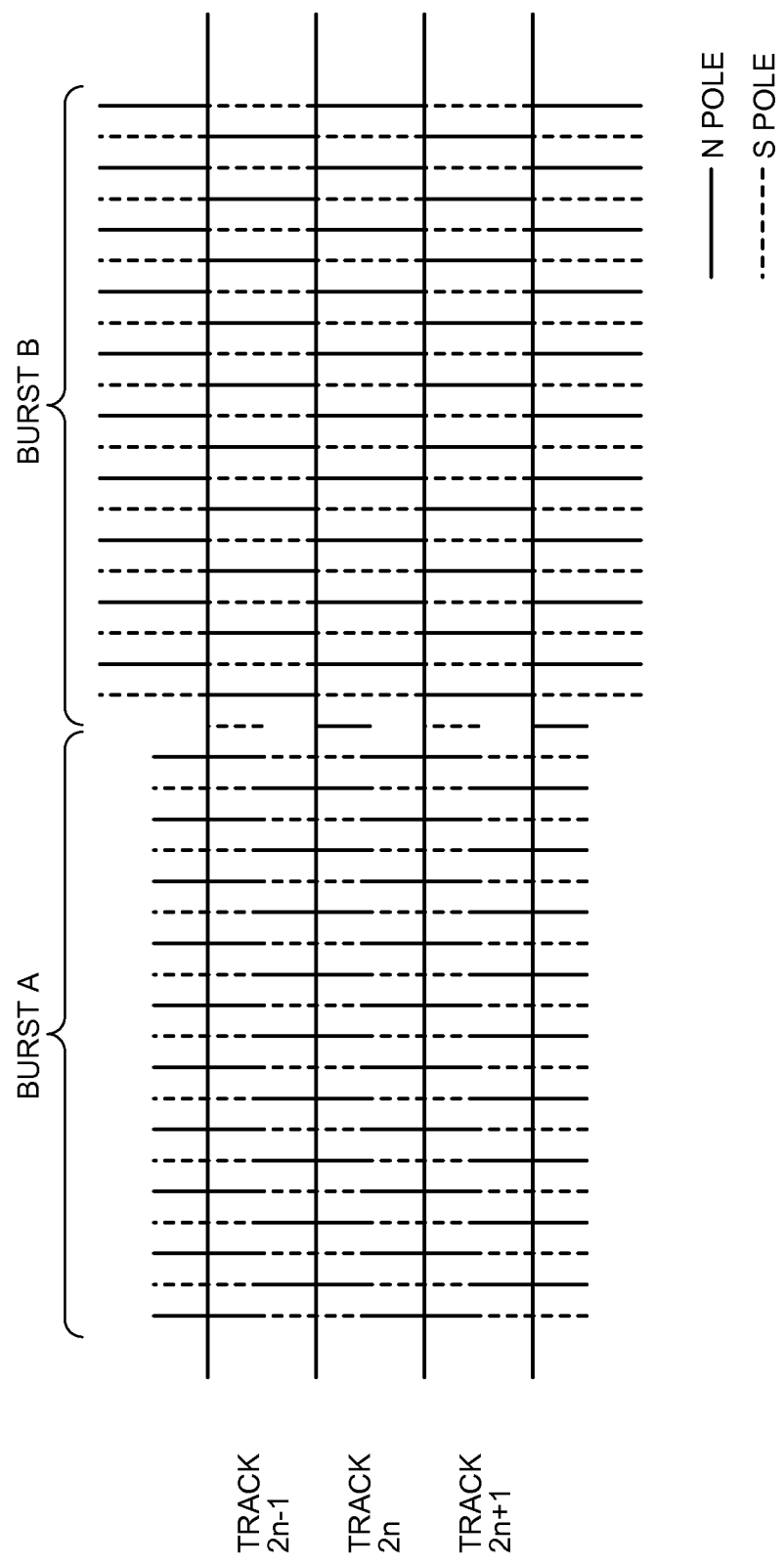
FIG. 2 is a diagram showing an example pattern of a burst portion of a magnetic disk in case of NULL demodulation.

Next, the burst portion of the magnetic disk 111 will be specifically described. FIG. 2 is a diagram showing an example pattern of the burst portion of the magnetic disk 111. As shown in FIG. 2, a two-phase NULL pattern is formed in the burst portion. The NULL pattern is formed of N poles and S poles, which have a length corresponding to the track pitch, alternately arranged. Hence, by accessing the NULL pattern with the read core of the magnetic head 122, a signal can be read out which changes with this period of the N poles and S poles.

In the present embodiment, a burst A for a position information signal PosA and a burst B for a position information signal PosB offset by 90 degrees in phase from the position information signal PosA are recorded as the two-phase NULL pattern. The burst A and burst B are placed next to each other. The burst A and burst B are formed such that their periods of the N poles and S poles are offset by half of the track pitch. Thus, the amplitude of the waveform is different between the signal read from the burst A and the signal read from the burst B by the magnetic head 122. Hence, the disk storage apparatus 100 according to the present embodiment can identify the position of the magnetic head 122 (the read core) (hereinafter also called a head position) from the difference in amplitude between the waveforms of the signals from the burst A and burst B.

In the disk storage apparatus 100 according to the present embodiment, correction is performed on the demodulated signal obtained by performing DFT (Discrete Fourier Transform) operation on the position information signals PosA, PosB recorded in the burst portion. The signal denoting the position of the magnetic head 122 relative to the center of the track having the detected track number (a signal to identify the head position) is demodulated from the demodulated signal after the correction.

Figure 3:
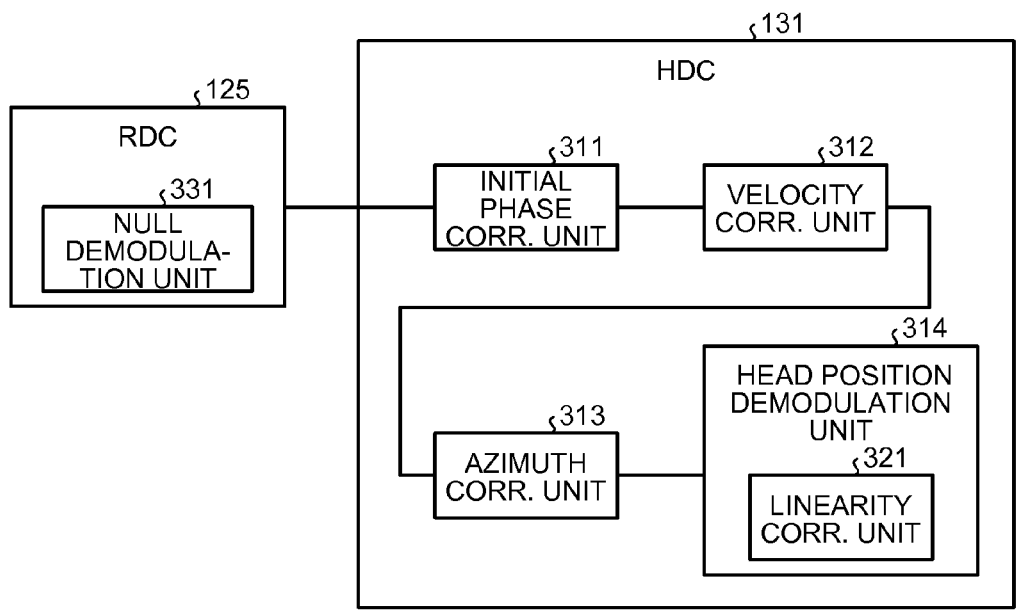
FIG. 3 is a diagram showing an example of configuration to perform position demodulation in an RDC and an HDC.

Next, the configuration for demodulating into the position will be described. FIG. 3 is a diagram showing an example of configuration to perform position demodulation in the RDC 125 and the HDC 131. The RDC 125 and the HDC 131 are included in a controller in the present embodiment.

The RDC 125 comprises a NULL demodulation unit 331. The NULL demodulation unit 331 performs DFT (Discrete Fourier Transform) operation on the position information signals PosA, PosB read by the magnetic head 122 from the NULL servo pattern recorded in the servo area of the magnetic disk 111. The NULL demodulation unit 331 demodulates into a demodulated signal A (a first demodulated signal) and a demodulated signal B (a second demodulated signal) as DFT operation results. There is a phase difference of 90 degrees between the demodulated signals A and B.

The HDC 131 comprises an initial phase correction unit 311, a velocity correction unit 312, an azimuth correction unit 313, and a head position demodulation unit 314. While the magnetic head 122 passes across a servo area, the HDC 131 with the above configuration performs a variety of correction on the demodulated signals inputted from the RDC 125 and then demodulates into the position signal of the magnetic head 122.

The initial phase correction unit 311 performs correction to displace (incline) the phases of the demodulated signals A and B inputted from the RDC 125 by predetermined angles. The velocity correction unit 312 performs correction according to the velocity of the magnetic head 122 (the actuator arm 115) (velocity correction) on the demodulated signals A and B processed by the initial phase correction unit 311. Specifically, the velocity correction unit 312 performs the velocity correction, thereby making the phase relation between the demodulated signals A and B correspond to the velocity of the magnetic head 122 being zero.

The demodulated signals A and B are each expressed as a vector including a sin component and a cos component. Conventional magnetic disk apparatuses obtain a phase angle θ from the direction of a vector expressed on the phase plane using the sin component of the demodulated signal A as the X coordinate and the sin component of the demodulated signal B as the Y coordinate. And the head position of the magnetic head 122 is identified from the phase angle θ. The sin component of the demodulated signal A and the sin component of the demodulated signal B used to identify the head position will be described.

Figure 4:
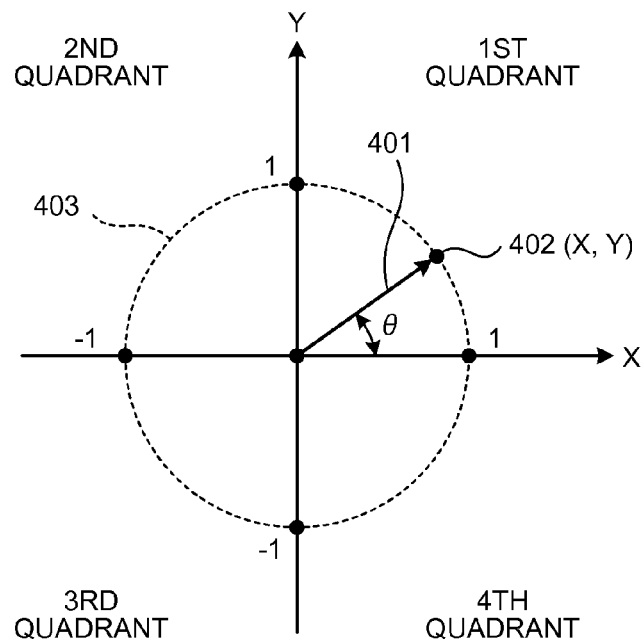
FIG. 4 is a diagram showing an example vector denoting demodulated signals on a phase plane.

FIG. 4 is a diagram showing an example phase plane with the sin component of the demodulated signal A assigned as the X coordinate and the sin component of the demodulated signal B as the Y coordinate. On the phase plane shown in FIG. 4, by plotting samples (pairs of the sin component of the demodulated signal A and the sin component of the demodulated signal B) sampled at predetermined timings, the vertex 402 of a vector 401 is obtained. There are no specific requirements on the sampling timings, and, for example, sampling may be performed over six cycles (12π) with eight samples per 2π. In the present embodiment, first to fourth quadrants on the phase plane are defined as shown in FIG. 4.

The vector 401 rotates counterclockwise on the circle indicated by a broken line as the magnetic head 122 moves in a radial direction to make change. The locus of the circle 403 described by the vertex 402 of the vector 401 holds samples (the sin component of the demodulated signal A and the sin component of the demodulated signal B) obtained when moving the magnetic head 122 in a radial direction. By plotting held results on the phase plane, a Lissajous figure (position Lissajous) is obtained.

If the obtained demodulated signals A and B are in sinusoidal waveforms, the position Lissajous describes a circle as shown in FIG. 4. However, when a position Lissajous is described using actually obtained demodulated signals A and B, various distortions occur due to factors such as the individual difference of the read core provided in the magnetic head 122.

Figure 5:
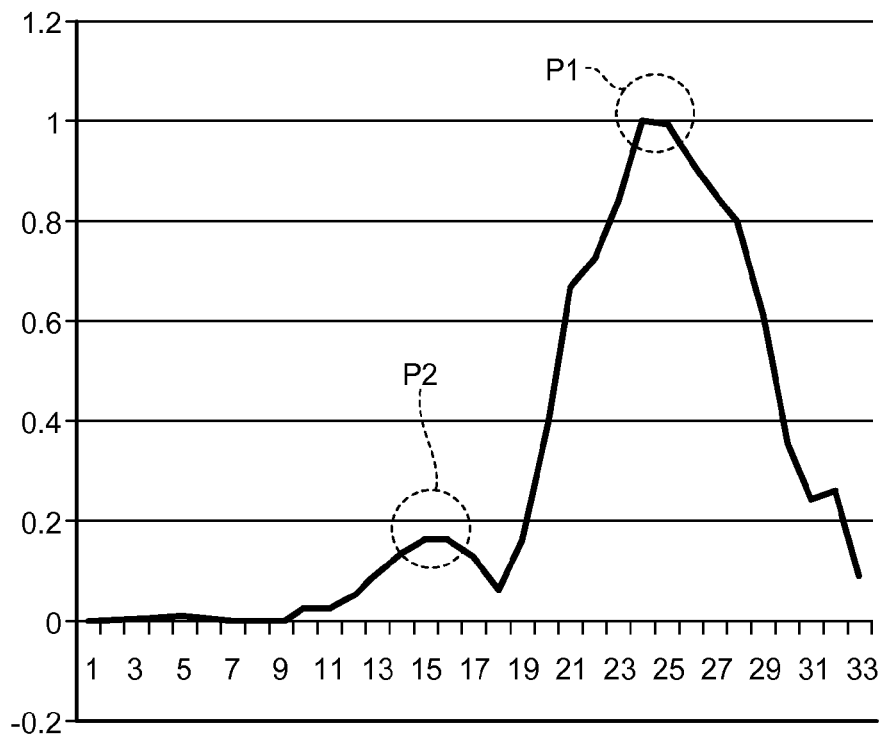
FIG. 5 is a diagram showing an example of read sensitivity characteristic of a magnetic head.

For example, with a magnetic head 122 (the read core) that is a conforming item, the sensitivity characteristic in reading data (read sensitivity characteristic) is bilaterally symmetrical with respect to the peak of sensitivity. However, among magnetic heads 122 of enough quality to be able to read/write, some individual items exist which have a second peak P2, called a side lobe, at the side of the peak P1 as shown in FIG. 5. FIG. 5 is a diagram showing an example of read sensitivity characteristic of the magnetic head 122. In FIG. 5, the vertical axis represents the sensitivity, and the horizontal axis represents the head position of the magnetic head 122.

With a magnetic head 122 having a side lobe in the read sensitivity characteristic, when a position Lissajous is obtained from the demodulated signals A and B, the phenomenon may be seen in which the position Lissajous is inclined. Further, with a magnetic head 122 having a side lobe in the read sensitivity characteristic, because the track pitch, the radial position of the head arm, the floating amount, and the like are affected by the side lobe, equivalently the core width of the read core seems changed, or the rotation angle seems changed. And because of changes in the core width or rotation angle, the position Lissajous is not circular, but is deformed into a rectangle shape with R's at the corners as shown in FIG. 6.

Figure 6:
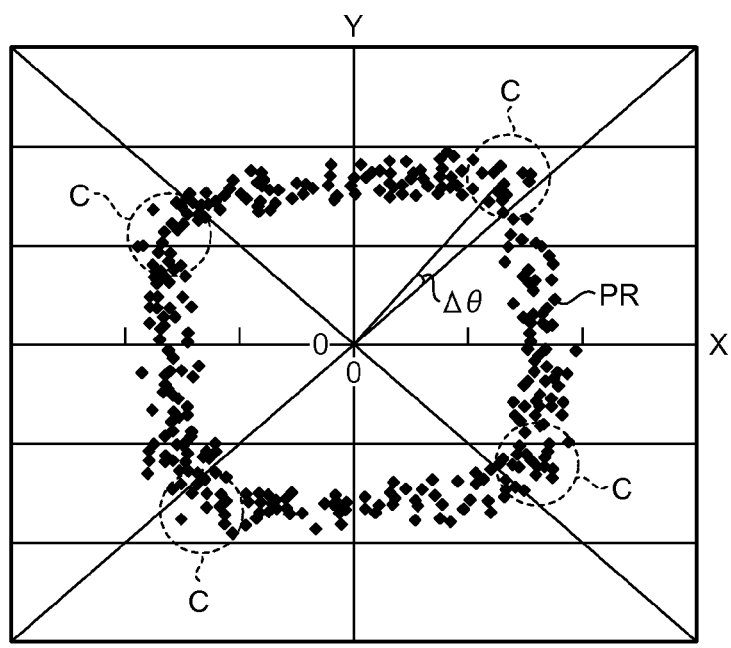
FIG. 6 is a diagram showing an example position Lissajous.

FIG. 6 is a diagram showing an example position Lissajous. With a magnetic head 122 having a side lobe in the read sensitivity characteristic, the position Lissajous PR is not circular, but may be deformed into a rectangle shape with R's at the corners C or inclined due to the influence of the side lobe as shown in FIG. 6. Further, it is known that the degree of such shape change is different for each zone of the magnetic disk 111. In the present embodiment, the state where sides of the position Lissajous are parallel or axisymmetric with respect to the reference axes (X and Y axes) of the phase plane is the correct position.

The above deformation of the position Lissajous causes a decrease in accuracy in identifying the position of the magnetic head 122 from the demodulated signals A and B. Accordingly, in the disk storage apparatus 100 of the present embodiment, the azimuth correction unit 313 and head position demodulation unit 314 (a linearity correction unit 321) shown in FIG. 3 determines a correction value for improving accuracy in position identifying for each magnetic head 122 or each zone of the magnetic disk 111.

The azimuth correction unit 313 performs correction (rotational correction) for removing inclination that occurs in the position Lissajous. First, the azimuth correction unit 313 acquires a set of the vector length and phase angle of the vector from each of vectors on the phase plane representing the demodulated signals A and B. Specifically, the azimuth correction unit 313 calculates the vector length, i.e., the distance d from the origin of the phase plane of the vector of each of the samples forming the position Lissajous. This distance d can be obtained from the following expression (1) using the Pythagorean theorem.

$$d=(a^2+b^2)^{1/2} \quad (1)$$

Here, a corresponds to the sin component of the demodulated signal A, and b corresponds to the sin component of the demodulated signal B.

While the calculation of the square root needs to be performed in order to calculate the distance using the expression (1), it is preferable to reduce the calculation amount for further speeding up. Accordingly, the above expression (1) may be rewritten as the arithmetic expression (2) in which $a^2+b^2$ on its right side is expressed in exponential notation with a radix of 2 containing exponent part m and mantissa part c so as to be calculated.

$$d=(c\times 2^m)^{1/2}=(c)^{1/2}\times 2^{m/2} \quad (2)$$

Here, for example, a numerical value of 0 to 256 is substituted for c, and an even number is substituted for m.

Figure 7:
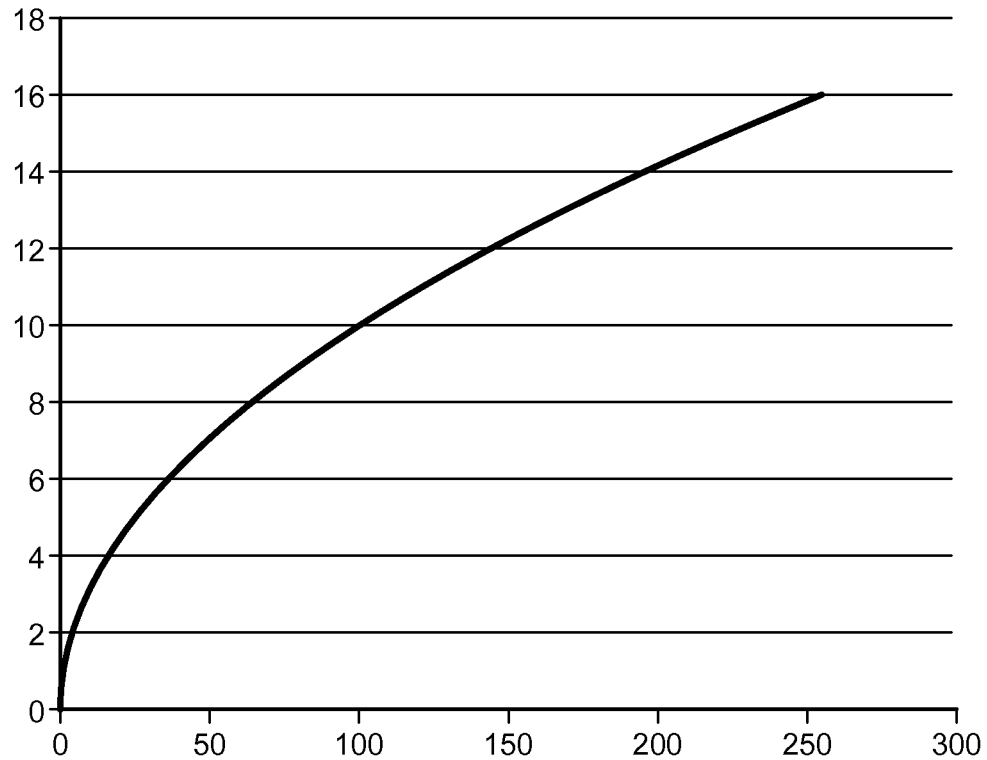
FIG. 7 is a diagram showing an example sqrt table.

The azimuth correction unit 313 sets the values of c and m such that the value of $(c\times 2^m)$ of the expression (2) coincides with or approximates the value of $(a^2+b^2)$ of the expression (1). Then the azimuth correction unit 313 refers to a table (sqrt table) defining the relation between c (0 to 256) and its square root to acquire the square root corresponding to the setting value of c. FIG. 7 is a diagram showing an example sqrt table. In this figure, the horizontal axis corresponds to the value of c, and the vertical axis corresponds to sqrt(c). It is supposed that the sqrt table is held beforehand.

The azimuth correction unit 313 substitutes the value of sqrt(c) acquired from the sqrt table into the expression (2) to calculate the value of the distance d. At this time, since m is an even number, the second term on the right side of the expression (2) is the calculation of a power of 2 (a shift operation). Thus, by using the expression (2), the value of the distance d can be approximately calculated with the calculation amount less than that for the expression (1), so that speeding up the processing can be achieved.

When calculating the distance d for each sample, the azimuth correction unit 313 holds it to be associated with the phase angle θ (see FIG. 4) on the phase plane of the sample.

Then the azimuth correction unit 313 detects the phase angle θ for which the distance d is greatest from among sets of distance d and phase angle θ respectively acquired for the vectors. Specifically, the azimuth correction unit 313 plots the acquired sets of distance d and phase angle θ on a plane with phase angle θ and distance d as coordinate axes (hereinafter called a distance/angle plane), thereby acquiring a distance/angle graph.

Figure 8:
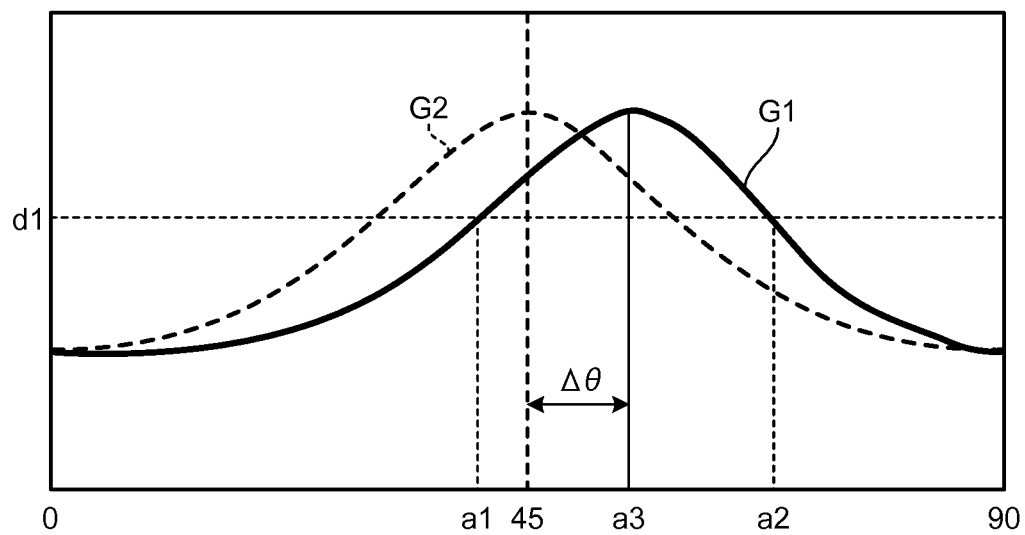
FIG. 8 is a diagram showing an example distance/angle graph.

FIG. 8 is a diagram showing an example distance/angle graph. In this figure, the horizontal axis corresponds to the phase angle θ, and the vertical axis corresponds to the distance d. Further, in this figure, the range of phase angles θ matches one quadrant (90 degrees) forming part of the phase plane shown in FIG. 4.

In the distance/angle graph G1, the position at which the distance d is greatest, that is, the peak position of the distance/angle graph G1 corresponds to a corner C of the position Lissajous. That is, the difference Δθ between the angle at the peak position of the distance/angle graph G1 and a reference angle (the center of the horizontal axis: 45 degrees) is the angle of inclination that occurs in the position Lissajous. Thus, the azimuth correction unit 313 detects the peak position of the distance/angle graph G1 and determines the difference Δθ between the angle at the detected peak position and the reference angle to be the correction amount in rotational correction (a rotational correction amount).

There are no specific requirements on the method of detecting the peak position of the distance/angle graph G1. For example, the first detecting method is for the azimuth correction unit 313 to differentiate the distance/angle graph G1 with respect to the angle so as to detect a point at which the differential (inclination) is zero as the peak position. Note that since the method using the differential is susceptible to noise in numerical operation, the accuracy may decrease.

Accordingly, the azimuth correction unit 313 may adopt the following method as the second detecting method. First, the azimuth correction unit 313 sets a specific distance that is an index in detecting a peak (hereinafter called an index distance). Then the azimuth correction unit 313 determines whether there are two angles of the distance/angle graph G1 under this index distance. If two angles under this index distance are obtained, the azimuth correction unit 313 detects the angle which is the middle point between these two angles as the peak position of the distance/angle graph G1.

For example, in FIG. 8, the azimuth correction unit 313 sets an index distance d1 and detects a middle point a3 between angles a1, a2 of two intersection points of this index distance d1 and the distance/angle graph G1 as the peak position of the distance/angle graph G1. The index distance may be of a predetermined value or set based on the shape or the like of the distance/angle graph.

If the second detecting method is used, the time required for numerical operation can be shortened as compared with the first detecting method, so that the peak position of the distance/angle graph G1 can be detected at higher speed. If the second detecting method is used, the influence of noise can be reduced as compared with the first detecting method, so that the peak position of the distance/angle graph G1 can be detected accurately.

Figure 9:
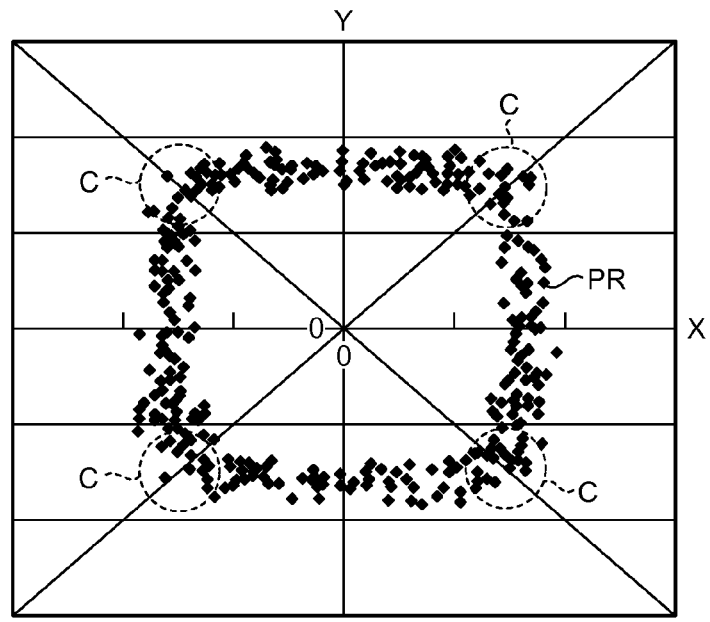
FIG. 9 is a diagram showing an example position Lissajous after rotational correction.

When calculating the rotational correction amount Δθ, the azimuth correction unit 313 corrects each sample in rotation based on this rotational correction amount Δθ. Thus, the inclination that occurred in the position Lissajous is removed as shown in FIG. 9, so that the position Lissajous is in the correct position. Accordingly, the peak position of the distance/angle graph G1 moves to be located at 45 degrees as indicated by the distance/angle graph G2 of FIG. 8.

The azimuth correction unit 313 executes rotational correction using a rotation operator given by the following expression (3). Here, Δθ in each matrix element corresponds to the rotational correction amount Δθ.

$$\begin{bmatrix} \cos\Delta\theta & -\sin\Delta\theta \\ \sin\Delta\theta & \cos\Delta\theta \end{bmatrix} \quad (3)$$

In order to execute rotational correction using the above rotation operator, the values of sin θ and cos θ need to be obtained by calculation or referring to a table such as a trigonometric function table. However, it is preferable to reduce the calculation amount or table-referencing occasions in number for speeding up.

Here, when θ≈0, cos θ approximates 1 and sin θ approximates θ. Accordingly, the correction unit may be configured to execute rotational correction using the following expression (4) into which the expression (3) is rewritten using this approximation relation. If the rotation operator given by the expression (4) is used, the calculation amount or the number of table-referencing occasions can be reduced, and hence further speeding up the rotational correction can be achieved.

$$\begin{bmatrix} 1 & -\Delta\theta \\ \Delta\theta & 1 \end{bmatrix} \quad (4)$$

Or the correction unit may be configured to execute rotational correction using the following expression (5) obtained by dividing the entire expression (3) by cos θ. That is, by holding the rotational correction amount in the dimension of tan θ, the calculation amount or the number of table-referencing occasions can be reduced, and hence speeding up the rotational correction can be achieved.

$$\begin{bmatrix} 1 & -\tan\Delta\theta \\ \tan\Delta\theta & 1 \end{bmatrix} \quad (5)$$

Figure 10:
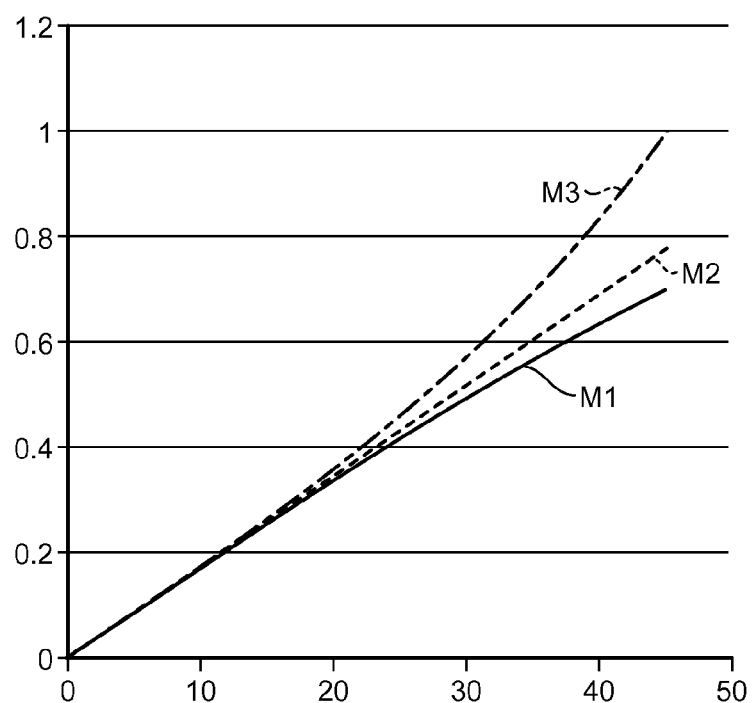
FIG. 10 is a diagram showing relation between rotation operators of expressions (3) to (5)

FIG. 10 is a diagram showing relation between the rotation operators of the expressions (3) to (5). In FIG. 10, the horizontal axis corresponds to the angle. The vertical axis corresponds to the numerical values of sin θ, θ, tan θ in the above expressions (3) to (5). In the figure, M1 denotes the graph of sin θ; M2 denotes the graph of θ; and M3 denotes the graph of tan θ.

When comparing the graphs M1 to M3, it is seen that the values of sin θ, θ, tan θ are the same from an angle of 0 to an angle of about 15 degrees and that as the angle becomes larger, the difference between the values grows. That is, when the rotational correction amount is in the range from 0 to about 15 degrees, the result of rotational correction using the rotation operator of the above expression (4), (5) is the same as when using the expression (3). Thus, if the rotational correction amount is in the range from 0 to 15 degrees, by using the rotation operator of the expression (4), (5), speeding up the correction can be achieved with maintaining the accuracy in the correction.

The azimuth correction unit 313 may switch the rotation operator to be used depending on the rotational correction amount such that it uses the rotation operator of the expression (4) or (5) if the rotational correction amount is in the range from 0 to 15 degrees and the rotation operator of the expression (3) if the rotational correction amount is greater than or equal to 15 degrees.

The azimuth correction unit 313 may be configured to execute the above rotational correction for each quadrant forming part of the phase plane or for all the quadrants at one time. For example, where it is configured to execute the correction for each quadrant, the distance/angle graph is produced for each quadrant, and the rotational correction should be executed for each quadrant based on the rotational correction amount $\Delta\theta$ obtained from that distance/angle graph. Where it is configured to execute the correction for all the quadrants at one time, the range of angles in the distance/angle plane is set to match one quadrant (90 degrees) as shown in FIG. 8, and samples of each quadrant are plotted being folded onto this distance/angle plane (laid one over another). Then, one distance/angle graph is produced from the result of plotting, and the rotational correction should be executed for all the quadrants based on the rotational correction amount $\Delta\theta$ obtained from that distance/angle graph. As such, in the case of the latter configuration, the rotational correction amount $\Delta\theta$ to be applied to all the quadrants can be derived from one distance/angle graph to correct the samples, and hence speeding up the processing can be achieved as compared with the configuration where the rotational correction amount $\Delta\theta$ is derived for each quadrant to correct them.

Referring back to FIG. 3, the head position demodulation unit 314 comprises the linearity correction unit 321 and demodulates the position of the magnetic head 122 (a read core) from the demodulated signals A, B corrected by the linearity correction unit 321. The head position demodulation unit 314 outputs the phase angle $\theta$ indicating the direction of the vector formed on the phase plane by the corrected demodulated signals A, B as the position signal of the magnetic head 122. Thus, the head position of the magnetic head 122 can be identified.

The linearity correction unit 321 executes correction to improve the linearity of the change in the phase angle $\theta$, that is, a value corresponding to the head position of the magnetic head 122 based on the change in the demodulated signals A, B before the head position demodulation unit 314 demodulates into the position. Where the position Lissajous is circular, because the linearity of the phase angle $\theta$ is high, the accuracy in identifying the head position is high. On the other hand, as the position Lissajous becomes closer to a rectangle, the linearity of the phase angle $\theta$ decreases, and hence the accuracy in identifying the head position decreases. Accordingly, in the present embodiment, correction to improve the linearity is executed.

Conventionally, if the position Lissajous is circular, the head position (the phase angle $\theta$) of the magnetic head 122 has been calculated using arctan(x). Here, when |demodulated signal B component|≤|demodulated signal A component|, the variable x is set equal to |demodulated signal B component|/|demodulated signal A component|, and when |demodulated signal B component|>|demodulated signal A component|, the variable x is set equal to |demodulated signal A component|/|demodulated signal B component|. Here, the demodulated signal A component is the sin component of the demodulated signal A, and the demodulated signal B component is the sin component of the demodulated signal B. However, if the position Lissajous is not circular but rectangular, calculation using arctan(x) results in a decrease in the accuracy in position detection.

Accordingly, the head position demodulation unit 314 demodulates the phase angle $\theta$ as a value corresponding to the head position of the magnetic head 122 from the value calculated using a quadratic polynomial given by the following expression (6).

$$(1-G_m)x+G_m x^2 \quad (6)$$

Here, $G_m$ is a coefficient (gamma coefficient) determined for correction to improve the linearity.

The linearity correction unit 321 determines the value of the coefficient $G_m$ based on the above distance/angle graph. Specifically, the linearity correction unit 321 detects a minimum value R1 and a maximum value R2 from among the distances (Lissajous radiuses) indicated by the distance/angle graph. Then the linearity correction unit 321 calculates maximum value R2/minimum value R1 to derive the ratio (hereinafter called a radius ratio) R of minimum value R1 to maximum value R2. The linearity correction unit 321 determines (identifies) the value of the coefficient $G_m$ corresponding to the derived value of the radius ratio R based on a table where the relation between the radius ratio R and coefficient $G_m$ is defined (a gamma correction table). Then the linearity correction unit 321 substitutes the identified coefficient $G_m$ into the quadratic polynomial given by the above expression (6) to execute position correction (linearity correction) using that quadratic polynomial. It is supposed that the gamma correction table is held beforehand.

Figure 11:
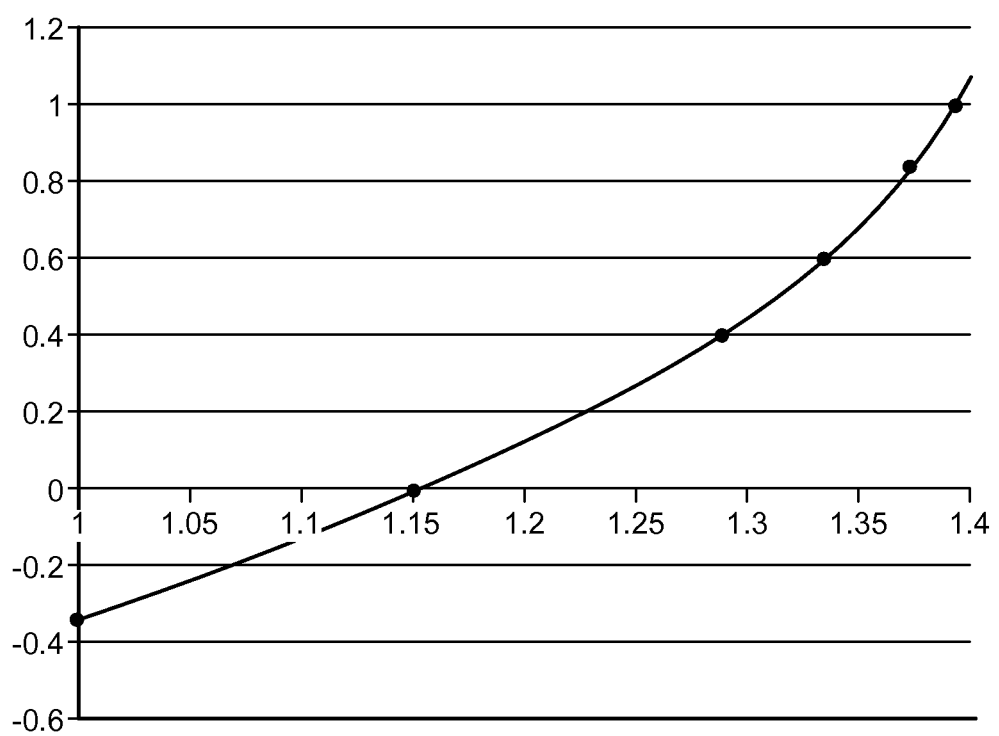
FIG. 11 is a diagram showing an example gamma correction table.

FIG. 11 is a diagram showing an example gamma correction table. In this figure, the horizontal axis corresponds to the radius ratio R, and the vertical axis corresponds to the coefficient $G_m$. In this gamma correction table, values of the coefficient $G_m$ for improving the linearity, that is, for obtaining the same demodulating result as when using a circular position Lissajous, are set to be associated with radius ratios.

The gamma correction table is generated based on the correlation between the radius ratio R and the coefficient $G_m$ derived from experimental data or the like. For example, the gamma correction table of FIG. 11 is formed by linear interpolation between six data values: $(R, G_m)=(1.00, -0.35)$, $(1.15, 0.00)$, $(1.29, 0.40)$, $(1.34, 0.643)$, $(1.368, 0.812)$, $(1.39, 1.0)$.

Although in the present embodiment the minimum value R1 and the maximum value R2 are detected by the linearity correction unit 321 from the distance/angle graph acquired by the azimuth correction unit 313, the invention is not limited to this. For example, the linearity correction unit 321 is configured to detect the minimum value R1 and the maximum value R2 from the distance/angle graph acquired by itself in the same way as the azimuth correction unit 313 does. Or the linearity correction unit 321 may detect the minimum value R1 and the maximum value R2 from the distance/angle graph before the rotational correction by the azimuth correction unit 313 or from the distance/angle graph after the rotational correction. Further, these correction units may be configured such that the rotational correction by the azimuth correction unit 313 and the detection of the minimum value R1 and the maximum value R2 by the linearity correction unit 321 are performed simultaneously.

Although in the present embodiment the linearity correction is performed even if the position Lissajous is close to a circular shape, that is, the radius ratio of minimum value R1 to maximum value R2 is close to 1, the invention is not limited to this. For example, the linearity correction unit 321 may be configured to determine whether the radius ratio R of minimum value R1 to maximum value R2 is less than or equal to a predetermined threshold (such as 1.03) and, if less than or equal to the threshold, to control not to perform linearity correction.

Next, the process for identifying the head position of the magnetic head 122 in the disk storage apparatus 100 will be described. FIG. 12 is a flow chart showing an example procedure of method of determining the correction value in the disk storage apparatus 100.

First, the disk storage apparatus 100 (CPU 126) determines whether all the magnetic heads 122 have been selected to be adjusted to (B1). If one or more not-yet adjusted-to magnetic heads 122 exist (No at B1), the CPU 126 selects one magnetic head 122 to be adjusted to from among the not-yet adjusted-to magnetic heads 122, and the process proceeds to B2.

Subsequently, the CPU 126 determines whether all the zones of the magnetic disk 111 corresponding to the to-be-adjusted-to magnetic head 122 have been selected to be adjusted to (B2). If one or more not-yet adjusted-to zones exist (No at B2), the CPU 126 selects one zone to be adjusted to from among the not-yet adjusted-to zones. Then the CPU 126 controls the motor driver 121 to move the to-be-adjusted-to magnetic head 122 so as to scan the to-be-adjusted-to zone. For example, the CPU 126 makes the to-be-adjusted magnetic head 122 scan back and forth within a range of about eight cylinders in size. Note that the initial value of the rotational correction amount $\Delta\theta$ is a fixed value such as a zero and that the initial value of the coefficient $G_m$ is a fixed value such as −0.35.

The RDC 125 (NULL demodulation unit 331) demodulates the servo pattern signal read by the to-be-adjusted-to magnetic head 122 from the magnetic disk 111. The demodulated signals (demodulated signals A, B) are inputted to the HDC 131 and, after processed by the initial phase correction unit 311 and velocity correction unit 312, are outputted to the azimuth correction unit 313.

The azimuth correction unit 313 measures the distance/angle graph for samples on the phase plane denoting the demodulated signals A, B (B3).

Then the azimuth correction unit 313 derives the rotational correction amount $\Delta\theta$ from the distance/angle graph and executes rotational correction based on the rotational correction amount $\Delta\theta$ (B4). It is supposed that in this processing the azimuth correction unit 313 executes rotational correction for the samples on all the quadrants of the phase plane at one time.

Further, the linearity correction unit 321 calculates the radius ratio R based on the distance/angle graph and determines (identifies) the coefficient $G_m$ corresponding to the radius ratio R from the gamma correction table (B5). The CPU 126 stores the rotational correction amount $\Delta\theta$ derived at B4 and the coefficient $G_m$ identified at B5 as correction values to be associated with the to-be-adjusted-to magnetic head 122 and zone into a flash ROM 128. Then the CPU 126 returns to B2.

At B2, if the CPU 126 determines that all the zones have been selected to be adjusted to (Yes at B2), the process returns to B1. Then, if the CPU 126 determines that all the magnetic heads 122 have been selected to be adjusted to (Yes at B1), the process finishes.

The correction values derived by the above adjusting process are used when the HDC 131 demodulates into the position signal under the control of the CPU 126. Specifically, the azimuth correction unit 313 and the head position demodulation unit 314 (linearity correction unit 321) execute rotational correction and linearity correction using correction values corresponding to the magnetic head 122 and zone, thereby demodulating into the position signal of the magnetic head 122.

The characteristics of the adjusting method in the present embodiment will be described in comparison with the conventional art. In the conventional art, the rotational correction amount $\Delta\theta$ used in rotational correction and coefficient $G_m$ are determined through independent processes.

For example, the method of determining the rotational correction amount in the conventional art is executed as follows. First, rotational correction is performed using each of different provisional rotational correction amounts (e.g., −5 degrees, +5 degrees), and the results of the correction are measured (acquired) as variation evaluation values. Then the linear interpolation of these evaluation values is performed, so that the rotational angle (e.g., 7 degrees) at which the evaluation value is zero is determined to be a right rotational correction amount $\Delta\theta$.

For example, the method of determining the coefficient $G_m$ in the conventional art is executed as follows. First, linearity correction is performed using each of different provisional coefficients $G_m$ (e.g., −0.4, 0, +0.4, +0.8), and the results of the correction are measured (acquired) as variation evaluation values. Then the parabola approximation of these evaluation values is performed, so that the value of the coefficient $G_m$ (e.g., 0.2) at which the evaluation value is smallest is determined to be a right coefficient $G_m$.

Here, the methods of determining the correction values in the present embodiment and the above methods of determining the correction values in the conventional art are compared. As to the rotational correction amount $\Delta\theta$, in the determining method of the conventional art, by performing scan a plurality of times using provisional rotational correction amounts, evaluation values need to be acquired. In contrast, in the determining method of the present embodiment, the rotational correction amount $\Delta\theta$ can be determined from the distance/angle graph of the position Lissajous obtained by one scan with a fixed rotational correction amount $\Delta\theta$. Thus, comparing in terms of scan time, the determining method of the conventional art takes a time two or more times longer than the determining method of the present embodiment to determine the rotational correction amount $\Delta\theta$.

Also as to the coefficient $G_m$, in the determining method of the conventional art, a plurality of evaluation values need to be acquired using provisional coefficients $G_m$. In contrast, in the determining method of the present embodiment, the coefficient $G_m$ can be determined from the distance/angle graph of the position Lissajous obtained by one scan with a fixed coefficient $G_m$. Thus, with the method of determining the coefficient $G_m$ in the present embodiment, the time required to determine the coefficient $G_m$ can be greatly reduced as compared with the determining method of the conventional art.

As described above, according to the present embodiment, sets of distance d and phase angle $\theta$ of the vectors are acquired from vectors on the phase plane denoting the demodulated signals A and B sampled at predetermined timings respectively, and the rotational correction amount is determined from the difference between the phase angle $\theta$ for a maximum distance d detected from among these sets and a reference angle. Thus, the rotational correction amount can be determined by one scan, so that the correction amount can be determined at high speed and efficiently.

Further, according to the present embodiment, sets of distance d and phase angle $\theta$ of the vectors are acquired from vectors on the phase plane denoting the demodulated signals A and B sampled at predetermined timings respectively, and the coefficient $G_m$ to be used in linearity correction is determined from the ratio (radius ratio R) between maximum and minimum distances d detected from among these sets. Thus, the coefficient $G_m$ can be determined by one scan, so that the correction amount can be determined at high speed and efficiently.

Yet further, according to the present embodiment, the rotational correction amount $\Delta\theta$ and the coefficient $G_m$ can be determined consecutively (seamlessly), and hence the correction values can be determined at high speed and efficiently.

While an embodiment of the present invention has been described, this embodiment has been presented by way of example only, and is not intended to limit the scope of the invention. Indeed, this novel embodiment may be implemented in a variety of other forms; furthermore, various omissions, substitutions and changes may be made thereto without departing from the spirit of the invention. The accompanying claims and their equivalents are intended to cover such forms or modifications as would fall within the scope and spirit of the inventions.

Although in the above embodiment, for example, the concepts of a variety of correction performed in the HDC 131 have been described using the position Lissajous, these are shown as examples for easiness of description, and the position Lissajous does not need to be actually generated in determining the correction values and correcting the demodulated signals A, B in the disk storage apparatus 100.

Although in the above embodiment the concepts of a variety of correction performed in the HDC 131 have been described using the distance/angle graph, these are shown as examples for easiness of description, and the distance/angle graph does not need to be actually generated in determining the correction values and correcting the demodulated signals A, B in the disk storage apparatus 100.

Although in the above embodiment the azimuth correction unit 313 is configured to determine the rotational correction value based on the signals (demodulated signals A, B) processed by the initial phase correction unit 311 and velocity correction unit 312 and to execute rotational correction, the unit is not limited to this configuration. For example, the azimuth correction unit 313 may be configured to determine the rotational correction value based on the signal outputted from the RDC 125 (NULL demodulation unit 331) and to execute rotational correction. Or the azimuth correction unit 313 may be configured to determine the rotational correction value based on the signal outputted from the initial phase correction unit 311 and to execute rotational correction.

What is claimed is:

1. A position demodulation apparatus comprising:
   a medium on which a servo pattern is recorded; and
   a controller comprises:
   a demodulation unit configured to demodulate a first demodulated signal and a second demodulated signal having a phase difference of 90 degrees from the first demodulated signal, based on a read signal read out by a head from the servo pattern;
   an acquiring unit configured to acquire a plurality of sets of a vector length and phase angle of vectors on a phase plane denoting the first and second demodulated signals sampled at particular timings respectively;
   a detecting unit configured to detect a phase angle for which the vector length is greatest based on the plurality of sets acquired by the acquiring unit; and
   a rotational correction unit configured to calculate difference between the phase angle detected by the detecting unit and a particular reference angle as a correction amount and executes rotational correction on each of the vectors so as to incline their angles by the correction amount.

2. The apparatus of claim 1, wherein the correction amount is an angle by which to correct an inclination of a Lissajous figure generated on the phase plane using the first and second demodulated signals relative to a reference axis on the phase plane.

3. The apparatus of claim 1, wherein the acquiring unit calculates the vector length using an arithmetic expression represented in exponential notation with a radix of 2 containing an exponent part and a mantissa part.

4. The apparatus of claim 1, wherein for all quadrants forming the phase plane, sets of a vector length and phase angle of the vectors belonging to each quadrant are plotted one over another on a plane having the phase angle range of one quadrant defined.

5. The apparatus of claim 4, wherein the detecting unit detects a phase angle at which the inclination of a graph, obtained by the plotting, that denotes a relation between the vector length and the phase angle is zero, as the phase angle at which the vector length is greatest.

6. The apparatus of claim 4, wherein the detecting unit detects a phase angle for middle point between two intersections of a graph, obtained by the plotting, that denotes a relation between the vector length and the phase angle and a specific vector length, as the phase angle at which the vector length is greatest.

7. The apparatus of claim 1, wherein the detecting unit detects a minimum value and a maximum value from among the vector lengths acquired by the acquiring unit, and the apparatus further comprising:
   a linearity correction unit configured to execute linearity correction to improve linearity of the first and second demodulated signals using a coefficient corresponding to the ratio of the detected minimum value to the detected maximum value.

8. The apparatus of claim 1, wherein the head has a plurality of heads, and
   wherein the rotational correction unit calculates the correction amount for each of the heads.

9. The apparatus of claim 1, wherein the medium is a disk-shaped medium and has a plurality of zones divided at a pitch along a radial direction from its rotation center, and
   wherein the rotational correction unit calculates the correction amount for each of the zones.

10. A position demodulation apparatus comprising:
    a medium on which a servo pattern is recorded; and
    a controller comprises:
    a demodulation unit configured to demodulate a first demodulated signal and a second demodulated signal having a phase difference of 90 degrees from the first demodulated signal, based on a read signal read out by a head from the servo pattern;
    an acquiring unit configured to acquire vector lengths of vectors on a phase plane denoting the first and second demodulated signals sampled at particular timings respectively;
    a detecting unit configured to detect a minimum value and a maximum value from among the vector lengths acquired by the acquiring unit; and
    a linearity correction unit configured to execute linearity correction to improve linearity of the first and second demodulated signals using a coefficient corresponding to the ratio of the detected minimum value to the detected maximum value.

11. The apparatus of claim 10, wherein the acquiring unit calculates the vector length using an arithmetic expression represented in exponential notation with a radix of 2 containing an exponent part and a mantissa part.

12. The apparatus of claim 10, wherein for all quadrants forming the phase plane, sets of a vector length and phase angle of the vectors belonging to each quadrant are plotted one over another on a plane having the phase angle range of one quadrant defined.

13. The apparatus of claim 12, wherein the detecting unit detects a phase angle at which the inclination of a graph, obtained by the plotting, that denotes a relation between the vector length and the phase angle is zero, as the phase angle at which the vector length is greatest.

14. The apparatus of claim 12, wherein the detecting unit detects a phase angle for middle point between two intersections of a graph, obtained by the plotting, that denotes a relation between the vector length and the phase angle and a specific vector length, as the phase angle at which the vector length is greatest.

15. The apparatus of claim 10, wherein the linearity correction unit determines a coefficient to be used in the linearity correction from a table in which the ratios are associated with coefficients corresponding to the ratios.

16. The apparatus of claim 10, wherein the head has a plurality of heads, and
wherein the rotational correction unit calculates the correction amount for each of the heads.

17. The apparatus of claim 10, wherein the medium is a disk-shaped medium and has a plurality of zones divided at a pitch along a radial direction from its rotation center, and
wherein the rotational correction unit calculates the correction amount for each of the zones.

18. A position demodulation method comprising:
demodulating a first demodulated signal and a second demodulated signal having a phase difference of 90 degrees from the first demodulated signal, based on a read signal read out by a head from a servo pattern recorded on a medium;
acquiring a plurality of sets of a vector length and phase angle of vectors on a phase plane denoting the first and second demodulated signals sampled at particular timings respectively;
detecting a phase angle for which the vector length is greatest based on the plurality of sets acquired; and
calculating difference between the detected phase angle and a particular reference angle as a correction amount and executing rotational correction on each of the vectors so as to incline their angles by the correction amount.

19. The method of claim 18, wherein for all quadrants forming the phase plane, sets of a vector length and phase angle of the vectors belonging to each quadrant are plotted one over another on a plane having the phase angle range of one quadrant defined.

20. The method of claim 18, further comprising:
detecting a minimum value and a maximum value from among the acquired vector lengths; and
executing linearity correction to improve linearity of the first and second demodulated signals using a coefficient corresponding to the ratio of the detected minimum value to the detected maximum value.

* * * * *